(12) United States Patent
Heikell

(10) Patent No.: US 11,810,014 B2
(45) Date of Patent: *Nov. 7, 2023

(54) SYSTEMS, METHODS AND APPARATUS FOR EVALUATING STATUS OF COMPUTING DEVICE USER

(71) Applicant: Nobots LLC, Renton, WA (US)

(72) Inventor: Timothy P. Heikell, Renton, WA (US)

(73) Assignee: Nobots LLC, Renton, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/882,082

(22) Filed: Aug. 5, 2022

(65) Prior Publication Data
US 2022/0398476 A1    Dec. 15, 2022

Related U.S. Application Data

(60) Continuation of application No. 16/578,823, filed on Sep. 23, 2019, which is a division of application No.
(Continued)

(51) Int. Cl.
*G06N 7/01* (2023.01)
*G06F 21/50* (2013.01)
*G06F 21/31* (2013.01)

(52) U.S. Cl.
CPC ............ *G06N 7/01* (2023.01); *G06F 21/316* (2013.01); *G06F 21/50* (2013.01); *G06F 2221/2133* (2013.01)

(58) Field of Classification Search
CPC ....... G06N 7/005; G06F 21/316; G06F 21/50; G06F 2221/2133
(Continued)

(56) References Cited

U.S. PATENT DOCUMENTS 5,375,244 A * 12/1994 McNair ................. G06F 21/32
710/200
5,933,498 A    8/1999 Schneck et al.
(Continued)

FOREIGN PATENT DOCUMENTS

JP    2007213409 A    8/2007
WO    WO2007090605 A1    8/2007

OTHER PUBLICATIONS

Al-Qayedi, et al., "Combined Web/Mobile Authentication for Secure Web Access Control", WCNC 2004, IEEE Communications Society, 2004, 5 pages.
(Continued)

*Primary Examiner* — Jacob Lipman
(74) *Attorney, Agent, or Firm* — Lee & Hayes, P.C.; Bea Koempel-Thomas

(57) ABSTRACT

Methods, systems and apparatus, e.g., non-transitory machine readable medium having stored thereon instructions, for providing a value indicating a judgment of whether a human or an autonomic computer application operating a client computer is interacting with a server, by operations comprising: receive data from the client computer including active data relating to interactions of the client computer with a website of the server and passive data of the client computer; analyze received data from the client computer for indication of a human operating the client computer, wherein the analyzing includes analyzing the received data in conjunction with model data based on human interactions from a prior session with the same website and developing a first analysis value; and provide a request for further data from the client computer when the first analysis value fails to meet the first analysis predetermined criteria.

30 Claims, 4 Drawing Sheets

Related U.S. Application Data

15/457,099, filed on Mar. 13, 2017, now Pat. No. 10,423,885, which is a continuation of application No. 12/313,502, filed on Nov. 19, 2008, now Pat. No. 9,595,008.

(60) Provisional application No. 61/003,743, filed on Nov. 19, 2007.

(58) Field of Classification Search
USPC .......................................................... 706/52
See application file for complete search history.

(56) References Cited

U.S. PATENT DOCUMENTS

| | | |
|---|---|---|
| 6,195,698 B1 | 2/2001 | Lillibridge et al. |
| 6,405,922 B1 | 6/2002 | Kroll |
| 6,460,141 B1 | 10/2002 | Olden |
| 7,089,241 B1 | 8/2006 | Alspector et al. |
| 7,373,524 B2 | 5/2008 | Motsinger et al. |
| 7,506,170 B2 | 3/2009 | Finnegan |
| 7,516,220 B1 | 4/2009 | Stiert |
| 7,606,915 B1 | 10/2009 | Calinov et al. |
| 7,657,849 B2 | 2/2010 | Chaudhri et al. |
| 7,680,891 B1 | 3/2010 | Pongsajapan |
| 7,721,107 B2 | 5/2010 | Golle et al. |
| 7,785,180 B1 | 8/2010 | Von Ahn et al. |
| 7,877,707 B2 | 1/2011 | Westerman et al. |
| 7,895,653 B2 | 2/2011 | Calo et al. |
| 7,917,491 B1 | 3/2011 | Sack |
| 7,917,508 B1 | 3/2011 | Baluja et al. |
| 7,945,952 B1 | 5/2011 | Behforooz |
| 7,980,953 B2 | 7/2011 | von Ahn Arellano |
| 8,032,483 B1 | 10/2011 | Haveliwala et al. |
| 8,056,129 B2 | 11/2011 | GuslerII et al. |
| 8,214,891 B2 | 7/2012 | Seacat |
| 8,280,993 B2 | 10/2012 | Awadallah et al. |
| 8,353,764 B2 | 1/2013 | Williams et al. |
| 8,413,250 B1 | 4/2013 | Krynski |
| 8,510,795 B1 | 8/2013 | Gargi |
| 8,601,538 B2 | 12/2013 | Qvarfordt et al. |
| 8,682,718 B2 | 3/2014 | Zwicky |
| 8,684,839 B2 | 4/2014 | Mattice et al. |
| 8,694,244 B2 | 4/2014 | Schalk |
| 8,700,259 B2 | 4/2014 | Schalk |
| 8,706,405 B2 | 4/2014 | Schalk |
| 8,713,657 B2 | 4/2014 | Lee |
| 8,738,287 B2 | 5/2014 | Schalk |
| 8,775,235 B2 | 7/2014 | Hedley et al. |
| 8,775,236 B2 | 7/2014 | Hedley et al. |
| 8,793,135 B2 | 7/2014 | Lewis et al. |
| 8,824,659 B2 | 9/2014 | Bushey et al. |
| 8,825,379 B2 | 9/2014 | Schalk |
| 8,838,570 B1 | 9/2014 | English |
| 8,903,052 B2 | 12/2014 | Moore et al. |
| 8,938,395 B2 | 1/2015 | Willner et al. |
| 9,047,458 B2 | 6/2015 | Etchegoyen |
| 9,088,652 B2 | 7/2015 | Bushey et al. |
| 9,152,381 B2 | 10/2015 | Valentino et al. |
| 9,208,461 B2 | 12/2015 | Busa |
| 9,240,078 B2 | 1/2016 | Hedley et al. |
| 2005/0008148 A1 | 1/2005 | Jacobson |
| 2005/0015257 A1 | 1/2005 | Bronstein |
| 2005/0066201 A1 | 3/2005 | Goodman et al. |
| 2005/0114705 A1 | 5/2005 | Reshef et al. |
| 2005/0144067 A1* | 6/2005 | Farahat .............. G06Q 30/0269 |
| | | 705/14.66 |
| 2005/0198158 A1 | 9/2005 | Fabre et al. |
| 2005/0278253 A1 | 12/2005 | Meek et al. |
| 2006/0015390 A1 | 1/2006 | Rijsinghani et al. |
| 2006/0136294 A1 | 6/2006 | Linden et al. |
| 2007/0016689 A1 | 1/2007 | Birch |
| 2007/0018393 A1 | 1/2007 | Ritter et al. |
| 2007/0038568 A1 | 2/2007 | Greene |
| 2007/0106737 A1 | 5/2007 | Barnes et al. |
| 2007/0165911 A1 | 7/2007 | Baentsch et al. |
| 2007/0192419 A1 | 8/2007 | Vuong et al. |
| 2007/0192849 A1 | 8/2007 | Golle et al. |
| 2007/0201745 A1 | 8/2007 | Wang et al. |
| 2007/0239604 A1* | 10/2007 | O'Connell .............. G06F 21/55 |
| | | 705/50 |
| 2007/0240230 A1 | 10/2007 | O'Connell et al. |
| 2007/0250920 A1 | 10/2007 | Lindsay |
| 2007/0255818 A1 | 11/2007 | Tanzer et al. |
| 2007/0255821 A1 | 11/2007 | Ge et al. |
| 2007/0259716 A1 | 11/2007 | Mattice et al. |
| 2007/0300077 A1 | 12/2007 | Mani et al. |
| 2008/0040653 A1 | 2/2008 | Levine |
| 2008/0049969 A1 | 2/2008 | Koziol |
| 2008/0066014 A1 | 3/2008 | Misra |
| 2008/0086524 A1* | 4/2008 | Afergan .................. H04L 67/02 |
| | | 709/202 |
| 2008/0091453 A1 | 4/2008 | Meehan et al. |
| 2008/0114624 A1 | 5/2008 | Kitts |
| 2008/0127302 A1 | 5/2008 | Qvarfordt et al. |
| 2008/0147456 A1 | 6/2008 | Broder et al. |
| 2008/0162200 A1 | 7/2008 | O'Sullivan et al. |
| 2008/0162227 A1 | 7/2008 | Jakobsson et al. |
| 2008/0225870 A1 | 9/2008 | Sundstrom |
| 2008/0263636 A1* | 10/2008 | Gusler ................ H04L 63/1466 |
| | | 726/4 |
| 2008/0281606 A1 | 11/2008 | Kitts et al. |
| 2008/0288303 A1 | 11/2008 | Gray et al. |
| 2008/0319774 A1 | 12/2008 | O'Sullivan et al. |
| 2009/0024971 A1 | 1/2009 | Willner et al. |
| 2009/0044264 A1 | 2/2009 | Ramanathan et al. |
| 2009/0055193 A1 | 2/2009 | Maislos et al. |
| 2009/0094311 A1 | 4/2009 | Awadallah et al. |
| 2009/0113294 A1 | 4/2009 | Sanghavi et al. |
| 2009/0150986 A1 | 6/2009 | Foreman |
| 2009/0197815 A1 | 8/2009 | Vincenzi et al. |
| 2009/0241174 A1 | 9/2009 | Rajan et al. |
| 2009/0249477 A1 | 10/2009 | Punera |
| 2009/0307028 A1 | 12/2009 | Eldon et al. |
| 2009/0320123 A1 | 12/2009 | Yu et al. |
| 2010/0037147 A1 | 2/2010 | Champion et al. |
| 2010/0070620 A1 | 3/2010 | Awadallah et al. |
| 2010/0211997 A1* | 8/2010 | McGeehan ........... H04L 63/107 |
| | | 726/4 |
| 2011/0029902 A1 | 2/2011 | Bailey |
| 2011/0113388 A1 | 5/2011 | Eisen et al. |
| 2013/0019290 A1 | 1/2013 | Lee |
| 2015/0112892 A1* | 4/2015 | Kaminsky ................ G06F 21/31 |
| | | 706/11 |

OTHER PUBLICATIONS

Daniel Lopresti CV, dated Apr. 2022, 56 pages.
File History for U.S. Appl. No. 10/423,885, filed Mar. 13, 2017, 226 pages.
File History for U.S. Pat. No. 9,595,008 filed Nov. 19, 2008, 137 pages.
"Fingerprint Reader: Replace Passwords with Your Fingerprint" retrieved on the internet on Aug. 16, 2018 at <<https://web.archive.org/web/20061230123302/http://www.microsoft.com/hardware/houseandkeyboard/productdetails.aspxZpid=036>> 1 page.
Good Prior Art Stipulation dated Apr. 29, 2022, 2 pages.
Initial Related Complaint from United States District Court, Western District of Texas, Waco Division, Case No. 6:21-cn1290, dated Dec. 20, 2021, 39 pages.
Declaration of Daniel P. Lopresti, Ph.D. for U.S. Pat. No. 9,595,008, dated Apr. 29, 2022, 120 pages.
Declaration of Daniel P. Lopresti, Ph.D. for U.S. Pat. No. 10,423,885, dated Apr. 29, 2022, 119 pages.
McCausland et al.,"A Proactice Risk-Awar Robitic Sensor Network for Critical Infrastructure Protection", IEEE International Conference on Computational Intelligence and Virtual Environments for Measurement Systems and Applications (CIVEMSA), Apr. 2013, pp. 132-137.
"Microsoft Fingerprint Reader" retrieved from the internet on Aug. 16, 2018 at << https//en.wikipedia.org/wikiMicrosoft_Fingerprint_Reader>>, 2 pages.

(56) References Cited

OTHER PUBLICATIONS

"Most people have at least 15 username and password combinations to remember" retrieved from the internet on Aug. 16, 2018 at <<https://web.archive.org/web/20050111041404/http://www.microsoft.com:80/hardware/mouseandkeyboard/features/docs/fingerprint.html >> 12 pages.

Office Action for U.S. Appl. No. 16/578,823, dated Apr. 5, 2022, Heikell, "Systems, Methods and Apparatus for Evaluating Status of Computing Device User", 10 pages.

Office action for U.S. Appl. No. 12/313,502, dated Sep. 16, 2011, Heikell, "Systems, Methods and Apparatus for Evaluating Status of Computing Device User", 9 pages.

Office Action for U.S. Appl. No. 15/457,099, dated Sep. 25, 2018, Heikell, "Systems, Methods and Apparatus for Evaluating Status of Computing Device User", 16 pages.

Pal et al., "Trust Assessment from Observed Behavior: Toward and Essential Service for Trusted Network Computing", Fifth IEEE International Symposium on Network Computing and Applications (NCA'06), Jul. 2006, pp. 285-292.

Petition for Inter Partes Review for U.S. Pat. No. 10,423,885 dated Apr. 29, 2022, 94 pages.

Petition for Inter Partes Review for U.S. Pat. No. 9,595,008 dated Apr. 29, 2022, 86 pages.

"Researcher Hacks Microsoft Fingerprint Reader" retrieved from the internet on Aug. 16, 2018 at <<https://www.pcworld.com/article/124978/article.html>> 3 pages.

Temple et al., "Testability Modeling and Analysis of a Rocket Engine Test Stand", IEEE Aerospace Conference, Jan. 2005, pp. 3874-3895.

"Tired of passwords? Replace them with your fingerprint" retrieved from the internet on Aug. 16, 2018 at <<https://web.archive.org/web/20040926002804/http://www.microsoft.com:80hardware;mouseandkeyboard/features/fingerprint.mspx>>, 1 page.

Ahn, et al., "CAPTCHA: Using Hard AI Problems for Security", Lecture Notes in Computer Science, vol. LNCS 2656, 2003, pp. 294-331.

Ahn, et al., "Human computation" Synthesis lectures on artificial intelligence and machine learning, vol. 5, No. 3, Jun. 2011, pp. 1-121.

Ahn, et al., "Labeling Images with a Computer Game", Association for Computing Machinery, New York, Apr. 24-29, 2004, pp. 319-326.

Ahn, et al., "reCAPTCHA: Human-Based Character Recognition via Web Security Measures", Science 321, No. 5895, Sep. 12, 2008, pp. 1465-1468.

Ahn, et al., "Telling Humans and Computers Apart (Automatically)", retreived on Mar. 28, 2022, <<https://web.archive.or /web/20070104074513/htt ://www.ca tcha.net:80/>>, Carnegie Mellon, 2004.

Andersen, et al., "Using alert levels to enhance keystroke dynamic authentication", Nov. 19-21, 2007, 9 pgs.

Athanasopoulos, et al., "Enhanced CAPTCHAs: Using animation to tell humans and computers apart" in IFIP International Conference on Communications and Multimedia Security, Springer, Berlin, Heidelberg, CMS 2006, LNCS 4237, Oct. 2006, pp. 97-108.

Baird, et al., "BaffleText: a human interactive proof," Proc. SPIE 5010, Document Recognition and Retrieval X, vol. 5010, (Jan. 13, 2003) pp. 305-316.

Baird, et al., "Implicit captchas" In IS&T/SPIE Document Recognition and Retrieval XII, vol. 5676, Jan. 16-20, 2006, pp. 191-196.

Baker, "Click Fraud and How to Stop It", retrieved on Dec. 7, 2004 at <<https://www.searchenginejournal.com/click-fraud-and-how-to-stop-it/1123/#closee>>, SearchEngine Journal.

Bannan, "Click Fraud Is Growing on the Web", Nov. 2, 2022, at <<https://www.nytimes.com/2006/09/23/technology/23click.html>>, The New York Times, Sep. 23, 2006.

Barras, "Robot Asimo can understand three voices at once", retrieved on Nov. 2, 2022, <<https://www.newscientist.com/article/dn14105-robot-asimo-can-understand-three-voices-at-once/#:~:text=Advanced%20humanoid%20robot%20Asimo%20just,out%20their%20choices%20at%20onces>>, NewScientist, Jun. 10, 2008.

BotBarrier, "Turn any digital image into a clickable CAPTCHA!", Captured Mar. 22, 2008 and Retrieved Online Nov. 16, 2022 from the internet Archive Wayback Machine at <<<https://web.archive.org/web/20080621051833/htp://ww.botbarrier.com:80/, BotBarrier>>>.

BotBarrier; "How effective is BotBarrier?" Captured by the Internet Archive Wayback Machine on Mar. 22, 2008 and Retrieved on Nov. 16, 2022 at <<<https://web.archive.org/web/20080322231602/http://www.botbarrier.com:80/faq.html>>>.

Chen et al., "Game bot detection based on avatar trajectory", International Conference on Entertainment Computing, Springer, Berlin, Heidelberg, 2008, pp. 94-105.

Chen, et al., "Identifying MMORPG bots: a traffic analysis approach" Proceedings of the 2006 ACM SIGCHI international conference on Advances in computer entertainment technology, Jun. 2006, pp. 1-13.

Chew, et al., "Image Recognition CAPTCHAs" In Zhang, K., Zheng, Y. (eds) Information Security, ISC 2004, Lecture Notes in Computer Science, vol. 3225, Springer, Berlin, Heidelberg, 2004, 19 pgs.

Chow, et al.,"Making CAPTCHAs clickable", Proceedings of the 9th workshop on Mobile computing systems and applications, 2008, pp. 91-94.

Click Tracking Software—TrafficSentry.com, "Click Hawk Click Fraud Detection Software", captured Jan. 27, 2022 on the Wayback Machine, retrieved online Nov. 18, 2022 from <<<https://web.archive.org/web/20220127223730/http://www.clickhawk.com/>>>.

Coates, "Pessimal Print: a Reverse Turing Test", IJDAR 5, 2003, pp. 158-163.

Codeen: "A Content Distribution Network for PlanetLab", Apr. 27, 2022, <<https://web.archive.org/web/20070210195838/https://codeen.cs.princeton.edu;80>>, PlanetLab.

Datta, et al., "Imagination: a robust image-based CAPTCHA generation system" In Proceedings of the 13th annual ACM international conference on Multimedia, 2005, pp. 331-334.

"Do you advertise on any of the pay-per-ciick networks or search engines?", retrieved on Apr. 29, 2022, <<https://web.archive.org/web/20070116074721/http:1 /clickhawk.com:80/faq.htm>>, Traffic Sentry, 2007.

RPX Insight, "Dossier: Human Differential Intelligence, LLC", RPX Corporation, Aug. 7, 2020, pp. 1-24.

Edwards, et al.,"The JavaScript Anthology: 101 Essential Tips, Tricks & Hacks.", Sitepoint, 2006, 626 pgs.

Elson, et al,. "Asirra: a CAPCHA that exploits interest-aligned manual image categorization", CCS 7, Oct. 29-Nov. 2, 2007 pp. 366-374.

*Nobots LLC* v *Google LLC*, "Google'S Preliminary Invalidity and Subject-Matter Ineligibility Contentions, Exhibit A-1", Case No. 6:21-cv-1290-ADA, in the United States District Court for the Western District of Texas Waco Division, Ex. A-1-008 Claim Chart for Willner, pp. 1-152.

*Nobots LLC* v *Google LLC*, "Google's Preliminary Invalidity and Subject-Matter Ineligibility Contentions, Exhibit A-10", Case No. 6:21-cv-1290-ADA, in the United States District Court for the Western District of Texas Waco Division, Ex. A-10-008 Claim Chart for Tanzer, pp. 1-211.

*Nobots LLC* v *Google LLC*, "Google's Preliminary Invalidity and Subject-Matter Ineligibility Contentions, Exhibit A-11-008", Case No. 6:21-cv-1290-ADA, in the United States District Court for the Western District of Texas Waco Division, Ex. A-11-008 Claim Chart for Eldon I, pp. 1-155.

*Nobots LLC* v *Google LLC*, "Google's Preliminary Invalidity and Subject-Matter Ineligibility Contentions, Exhibit A-12-008", Case No. 6:21-cv-1290-ADA, in the United States District Court for the Western District of Texas Waco Division, Ex. A-12-008 Claim Chart with Obviousness Combinations, pp. 1-590.

*Nobots LLC* v *Google LLC*, "Google's Preliminary Invalidity and Subject-Matter Ineligibility Contentions, Exhibit A-2-008", Case

(56) References Cited

OTHER PUBLICATIONS

No. 6:21-cv-1290-ADA, in the United States District Court for the Western District of Texas Waco Division, Ex. A-2-008 Claim Chart for Ge, pp. 1-171.

*Nobots LLC* v *Google LLC*, "Google's Preliminary Invalidity and Subject-Matter Ineligibility Contentions, Exhibit A-3-008", Case No. 6:21-cv-1290-ADA, in the United States District Court for the Western District of Texas Waco Division, Ex. A-3-008 Claim Chart for O'Sullivan I. pp. 1-207.

*Nobots LLC* v *Google LLC*, "Google's Preliminary Invalidity and Subject-Matter Ineligibility Contentions, Exhibit A-4 008", Case No. 6:21-cv-1290-ADA, in the United States District Court for the Western District of Texas Waco Division, Ex. A-4-008 Claim Chart for O'Connell I, pp. 1-154.

*Nobots LLC* v *Google LLC*, "Google's Preliminary Invalidity and Subject-Matter Ineligibility Contentions, Exhibit A-5 008", Case No. 6:21-cv-1290-ADA, in the United States District Court for the Western District of Texas Waco Division, Ex. A-5-008 Claim Chart for Krynski, pp. 1-178.

*Nobots LLC* v *Google LLC*, "Google's Preliminary Invalidity and Subject-Matter Ineligibility Contentions, Exhibit A-6 008", Case No. 6:21-cv-1290-ADA, in the United States District Court for the Western District of Texas Waco Division, Ex. A-6-008 Claim Chart for Farahat, pp. 1-144.

*Nobots LLC* v *Google LLC*, "Google's Preliminary Invalidity and Subject-Matter Ineligibility Contentions, Exhibit A-7", Case No. 6:21-cv-1290-ADA, in the United States District Court for the Western District of Texas Waco Division, Ex. A-7-008 Claim Chart for Awadallah I, pp. 1-189.

*Nobots LLC* v *Google LLC*, "Google's Preliminary Invalidity and Subject-Matter Ineligibility Contentions, Exhibit A-8 008", Case No. 6:21-cv-1290-ADA, in the United States District Court for the Western District of Texas Waco Division, Ex. A-8-008 Claim Chart for Kitts I, pp. 1-139.

*Nobots LLC* v *Google LLC*, "Google'S Preliminary Invalidity and Subject-Matter Ineligibility Contentions, Exhibit A-9 008", Case No. 6:21-cv-1290-ADA, in the United States District Court for the Western District of Texas Waco Division, Ex. A-9-008 Claim Chart for Meek, pp. 1-143.

*Nobots LLC* v *Google LLC*, "Google'S Preliminary Invalidity and Subject-Matter Ineligibility Contentions, Exhibit B-1-885", Case No. 6:21-cv-1290-ADA, in the United States District Court for the Western District of Texas Waco Division, Ex. B-1-885 Claim Chart for Willner I, pp. 1-140.

*Nobots LLC* v *Google LLC*, "Google'S Preliminary Invalidity and Subject-Matter Ineligibility Contentions, Exhibit B-2 885", Case No. 6:21-cv-1290-ADA, in the United States District Court for the Western District of Texas Waco Division, Ex. B-2-885 Claim Chart for Ge, pp. 1-144.

*Nobots LLC* v *Google LLC*, "Google's Preliminary Invalidity and Subject-Matter Ineligibility Contentions, Exhibit A-1", Case No. 6:21-cv-1290-ADA, in the United States District Court for the Western District of Texas Waco Division, Ex. B-3-885 Claim Chart for O'Sullivan I, pp. 1-219.

*Nobots LLC* v *Google LLC*, "Google's Preliminary Invalidity and Subject-Matter Ineligibility Contentions, Exhibit B-4 885", Case No. 6:21-cv-1290-ADA, in the United States District Court for the Western District of Texas Waco Division, Ex. B-4-885 Claim Chart for Meek, pp. 1-157.

*Nobots LLC* v *Google LLC*, "Google's Preliminary Invalidity and Subject-Matter Ineligibility Contentions, Exhibit B-5-885", Case No. 6:21-cv-1290-ADA, in the United States District Court for the Western District of Texas Waco Division, Ex. B-5-885 Claim Chart for Tanzer, pp. 1-163.

*Nobots LLC* v *Google LLC*, "Google's Preliminary Invalidity and Subject-Matter Ineligibility Contentions, Exhibit B-6 885", Case No. 6:21-cv-1290-ADA, in the United States District Court for the Western District of Texas Waco Division, Ex. B-6-885 Claim Chart for Kitts I, pp. 1-150.

*Nobots LLC* v *Google LLC*, "Google's Preliminary Invalidity and Subject-Matter Ineligibility Contentions, Exhibit B-7 885", Case No. 6:21-cv-1290-ADA, in the United States District Court for the Western District of Texas Waco Division, Ex. B-7-885 Claim Chart for Gusler I, pp. 1-142.

*Nobots LLC* v *Google LLC*, "Google'S Preliminary Invalidity and Subject-Matter Ineligibility Contentions, Exhibit B-8", Case No. 6:21-cv-1290-ADA, in the United States District Court for the Western District of Texas Waco Division, Ex. B-8-885 Claim Chart with Obviousness Combinations, pp. 1-239.

*Nobots LLC* v *Google LLC*, "Google'S Preliminary Invalidity and Subject-Matter Ineligibility Contentions, Exhibit C-008", Case No. 6:21-cv-1290-ADA, in the United States District Court for the Western District of Texas Waco Division, Ex. C-008 Claim Chart with Subject-Matter Eligibility Contentions, pp. 1-61.

*Nobots LLC* v *Google LLC*, "Google'S Preliminary Invalidity and Subject-Matter Ineligibility Contentions, Exhibit D-885", Case No. 6:21-cv-1290-ADA, in the United States District Court for the Western District of Texas Waco Division, Ex. D-885 Claim Chart with Subject-Matter Eligibility Contentions, pp. 1-53.

Flanagan, "JavaScript: the Definitive Guide", vol. 1018, O'reilly, Aug. 2006, 1023 pgs.

Fung, et al., "Detecting Cheaters for Multiplayer Games: Theory, Design and Implementation", IEEE CCNC 2006 proceedings, Jan. 8-10, 2006, pp. 1178-1182.

Gamboa, et al., "A behavioral biometric system based on human-computer interaction", Proc. SPIE 5404, Biometric Technology for Human Identification, vol. 5404, Aug. 25, 2004, pp. 381-392.

Ghosemajumder, "Google, click fraud and invalid clicks" <<http://shumans.com/articles/000044.php>>, Dec. 12, 2006.

Golle, "Machine learning attacks against the Asirra CAPTCHA", Proceedings of the 15th ACM conference on Computer and communications security, 2008, pp. 535-542.

Golle, et al."Preventing bots from playing online games", ACM Computers in Entertainment, vol. 3, No. 3, Article 3C, Jul. 2005, 10 pgs.

Gossweiler, et al.,"What's up CAPTCHA? A CAPTCHA Based on Image Orientation", Proceedings of the 18th international conference on World wide web, 2009, pp. 841-850.

Immorlica, et al., "Click Fraud Resistant Methods for Learning Click-Through Rates" In International Workshop on Internet and Network Economics,Springer, Berlin, Heidelberg, 2005, pp. 34-45.

Ives, "Web Marketers Fearful of Fraud in Pay-Per-Click", The New York Times, 2005, 3 pgs.

Jain, et al., "Biometrics: Personal Identification in Networked Society", Springer Science & Business Media, 1999, 411 pgs.

Jain, et. ai., "Handbook of biometrics" Springer Science & Business Media, 2007, 550 pgs.

Jakobsson, "Crimeware: Understanding New Attacks and Defenses", Addison-Wesley Professional, 2008, 597 pgs.

Koch, "PPK on JavaScript", New Riders, 2006, 530 pgs.

Kochanski, et al., "A Reverse Turing Test using speech", Proceedings of the Seventh International Conference on Spoken Language Processing, Denver, Colorado, USA, Sep. 16-20, 2002, pp. 1357-1360.

Larsen, et al., "An introduction to mathematical statistics and its applications" 2018, 930 pgs.

Lopresti, "Leveraging the CAPTCHA Problem", International Workshop on Human Interactive Proofs, Springer, Berlin, Heidelberg, May 2005, pp. 97-110.

Marin, "How click fraud could swallow the internet", Wired Magazine 14, No. 1, Jan. 1, 2006, 4 pgs.

May, "Escape from CAPTCHA" retrieved on Nov. 2, 2022, at <<https://www.w3.org/2004/Talks/0319-csun-m3m/>>.

May, "Inaccessibility of CAPTCHA", Alternatives to Visual Turing Tests on the Web, W3C Working Group Note, Nov. 23, 2005, 7 pgs.

McConnell, "Code Complete 2nd edition", Publishing House of Electronics Industry, Jan. 1, 2006, 974 pgs.

Microsoft Corporation, Online Video for "Introducing Microsoft Fingerprint Reader," Captured Jan. 11, 2005, on the Internet Archive Wayback Machine at <<<https://web.archive.org/web/2005011104104/http://www.microsoft.com/hardware/mouseandkeyboard/features/docs/>>>.

(56) References Cited

OTHER PUBLICATIONS

Moncur, "Sams Teach Yourself JavaScript in 24 Hours", Sams, Switzerland, 2002, 445 pgs.

*Nobots LLC* v *Google LLC*, "Google'S Preliminary Invalidity and Subject-Matter Ineligibility Contentions", Case No. 6:21-cv-1290-ADA, in the United States District Court for the Western District of Texas Waco Division, pp. 1-111.

Office Action for U.S. Appl. No. 17/874,137, dated Oct. 27, 2022, Heikell, "Systems, Methods and Apparatus for Evaluating Status of Computing Device User", 9 pages.

Office Action for U.S. Appl. No. 17/874,137, dated Oct. 28, 2022, Heikell, "Systems, Methods and Apparatus for Evaluating Status of Computing Device User", 12 pages.

Oli, "The Cutest Human-Test: KittenAuth", retrieved on Nov. 2, 2022, <<https://thepospy.com/read/the-cutest-humantest-kittenauth/>>, Apr. 6, 2006.

Pal, et al., "Trust assessment from observed behavior: Toward and essential service for trusted network computing", in Fifth IEEE International Symposium on Network Computing and Applications (NCA'06), IEEE, 2006, pp. 285-292.

Park, et al.,"Securing Web Service by Automatic Robot Detection" in USENIX Annual Technical Conference, General Track, 2006, pp. 255-260.

Penenberg, "BlowSearch Tackles Click Fraud", at <<chttp://www.wired.com/2005/06/blowsearch-tackles-click-fraud/>>, Wired, Jun. 18, 2005.

Piccardi, "Background subtraction techniques: a review", 2004 IEEE International Conference on Systems, Man and Cybernetics, 2004, p. 3099-3104.

Pilgrim, "Greasemonkey Hacks: Tips & Tools for Remixing the Web with Firefox" O'Reilly Media, Inc., 2005, 498 pgs.

Powell, et al., "JavaScript:The Complete Reference", McGraw-Hill/Osborne, Inc, 2004, 978 pgs.

"ReCAPTCHA: Using Captchas to Digitize Books", retreived on Jan. 18, 2022, <<https://techcrunch.com/2007/09/16/recaptcha-using-captchas-to-digitize-books/>>, TechCrunch, Sep. 16, 2007.

Ross, et al., "Human recognition using biometrics: an overview" In Annales Des Télécommunications, vol. 62, No. 1, Springer-Verlag, Jan. 2007, pp. 11-35.

Rui, et al., "Characters or faces: a User Study on Ease of Use for HIPs" International Workshop on Human Interactive Proofs, Springer, Berlin, Heidelberg, 2005, pp. 53-65.

Rusu, "Exploiting the gap in human and machine abilities in handwriting recognition for web security applications", University of New York at Buffalo, Aug. 2007, 141 pgs.

Saygin, et al., "Turing Test: 50 Years Later", Minds and Machines, vol. 10, 2000, pp. 463-518.

Shirali-Shahreza, et al., "CAPTCHA for Blind People", 2007 IEEE International Symposium on Signal Processing and Information Technology, pp. 995-998, 2007.

Shirali-Shahreza et al., "CAPTCHA for Children", 2008 IEEE International Conference on System of Systems Engineering, 2008, pp. 1-6.

Shirali-Shahrezaet, et al., "Bibliography of works done on CAPTCHA", 2008 3rd International Conference on Intelligent System and Knowledge Engineering, vol. 1, 2008, pp. 205-210.

Silva, et al., "Ka-CAPTCHA: an Opportunity for Knowledge Acquisition on the Web", in AAAI, 2007, pp. 1322-1327.

Sion, et a., "On-the-fly intrusion detection for web portals" In Proceedings ITCC 2003. International Conference on Information Technology: Coding and Computing, IEEE, Apr. 28-30, 2003, pp. 325-330.

Sylvain, et al., "Users Authentication by a study of human computer interactions", Universite Fran, ois-Rabelais, Tours-France, May 18, 2004, 6 pgs.

Tam, et al., "Breaking Audio CAPTCHAs", Advances in Neural Information Processing Systems 21, Dec. 8, 2008, pp. 1-8.

Tan, et al., "Discovery of Web Robot Sessions Based on their Navigtional Patterns", Intelligent Technologies for Information Analysis, Springer-Verlang, Berlin, Heidelberg, 2004, 30 pgs.

Thau, "The Book of JavaScript, 2nd Edition: a Practical Guide to Interactive Web Pages", No Starch Press, 2006, 529 pgs.

Thompson, "For Certain Tasks, the Cortex Still Beats the CPU", retrieved on Jan. 18, 2022, Wired, Jun. 25, 2007, 11 pgs.

Tuzhilin, "The lane's gifts v. google report", Official Google Blog: Findings on invalid clicks, posted 2006, 47 pgs.

Vincent, "JavaScript Developer's Dictionary", Sams, United Kingdom, 2002, 1175 pgs.

Walker, "In Game of Click and Mouse, Advertisers Come up Empty", retrieved on Nov. 2, 2022, <<https://www.netmagellan.com/in-game-of-ciick-and-mouse-advertisers-come-up-empty-279.html>>, NetMahellan, Mar. 16, 2006, 2 pgs.

Yampolskiy, et al.,"Embedded Noninteractive Continuous Bot Detection", ACM Computers in Entertainment, vol. 5, No. 4, Article 7, Mar. 2008, 11 pgs.

Yan, "Bot, Cyborg and Automated Turing Test" International Workshop on Security Protocols, Lecture Notes in Computer Science, vol. 5087, Springer, Berlin, Heidelberg, Jun. 2006, pp. 190-197.

Zakas, "Professional JavaScript for Web Developers" Wiley Publishing, Inc., 2009, 660 pgs.

Al-Qayed, et al., "Secure Centralised Mobile and Web-based control system Using GPRS with J2ME", ICECS2003 Sharjah U.A.E 2003, 5 pgs.

Baird & Lopresti, Human Interactive Proofs: Second International Workshop, HIP 2005, Bethlehem, PA, USA, Proceedings, vol. 3517, May 19-20, 2005, Springer.

Baird, et al., "ScatterType: A Legible but Hard-to-Segment CAPTCHA," Eighth International Conference on Document Analysis and Recognition (ICDAR'05). IEEE, Korea, 2005, 6 pgs.

Chu, et al., "A Hybrid Training Mechanism for Applying Neural Networks to Web-based Applications," 2004 IEEE International Conference on Systems, Man and Cybernetics (IEEE Cat. No. 04CH37583), vol. 4, IEEE, 2004, pp. 3543-3545.

Microsoft Corporation, Online Video for "Introducing Microsoft Fingerprint Reader," Captured Jan. 11, 2005, on The Internet Archive Wayback Machine at <<https://web.archive.org/web/2005011104104/http://www.microsoft.com/hardware/mouseandkeyboard/features/docs/>>, 1 pg.

Rusu, et al., "Visual CAPTCHA with handwritten image analysis", International Workshop on Human Interactive Proofs, Springer, Berlin, Heidelberg, 2005, pp. 42-52.

Thau, "The Book of JavaScript, 2nd Edition: A Practical Guide to Interactive Web Pages", No Starch Press, 2006, Part 1, 120 pgs.

Thau, "The Book of JavaScript, 2nd Edition: A Practical Guide to Interactive Web Pages", No Starch Press, 2006, Part 2, 120 pgs.

Thau, "The Book of JavaScript, 2nd Edition: A Practical Guide to Interactive Web Pages", No Starch Press, 2006, Part 3, 120 pgs.

Thau, "The Book of JavaScript, 2nd Edition: A Practical Guide to Interactive Web Pages", No Starch Press, 2006, Part 4, 169 pgs.

Von Ahn, et al., "Telling Humans and Computers Apart (Automatically) or How Lazy Cryptographers Do AI," Computer Science Department, Carnegie Mellon University, 2002, 11 pgs.

Yan, Jeff, "Bot, Cyborg and Automated Turing Test: (Or Putting the Humanoid in the Protocol)," Security Protocols: 14th International Workshop, Cambridge, UK, 2006, Revised Selected Papers 14, Springer, 2009, 15 pgs.

"Most people have at least 15 username and password combinations to remember" retrieved from the internet on Aug. 16, 2018 at <<https://web.archive.org/web/20050111041404/http://www.microsoft.com:80/hardware/mouseandkeyboard/features/docs/fingerprint.html>>, 12 pgs.

* cited by examiner

SYSTEMS, METHODS AND APPARATUS FOR EVALUATING STATUS OF COMPUTING DEVICE USER

This application is a continuation application of and claims priority to application Ser. No. 16/578,823 filed Sep. 23, 2019, which is a divisional application of application Ser. No. 15/457,099 filed Mar. 13, 2017 and issued as U.S. Pat. No. 10,423,885 on Sep. 24, 2019, which claims priority to application Ser. No. 12/313,502 filed Nov. 19, 2008 and issued as U.S. Pat. No. 9,595,008 on Mar. 14, 2017, which claims priority to provisional application Ser. No. 61/003,743 filed Nov. 19, 2007, all of which are incorporated herein by reference.

BACKGROUND

The Internet is a fantastic tool for constructive web sites to gather users for a common purpose; however, the Internet is also a fantastic tool for abuse of these same web sites. People who want to take advantage of websites do so by creating automated programs employing various algorithms and routines (hereinafter "bots") that create fictitious accounts or access content for a multitude of reasons.

In an effort to block these bots, builders of web sites have created a variety of tests to determine if the user is a bot or if the user is a human. Initial efforts required a user to simply enter an alphanumeric string into an input field. However, as character recognition engines became more available, such "tests" became easily defeated. What was needed was a more robust form of test—one that couldn't be easily defeated.

Carnegie Mellon University coined the term "CAPTCHA" (Completely Automated Public Turing test to tell Computers and Humans Apart) for these types of tests. A common type of CAPTCHA requires that the user type the letters, digits or characters of a distorted image appearing on the screen. The objective is to create an image that a bot cannot easily parse but that is discernable by a human. Such efforts have been successful in preventing non-adaptive software from recognizing the imaged characters, but people intent on abusing these sites have designed ways to circumvent the CAPTCHA, such as through specially tuned character recognition programs. A brief survey of the Internet will reveal many resources that describe how to tune and/or use character recognition to decipher CAPTCHA including aiCaptcha, Simon Fraser University and PWNtcha.

The result of the foregoing is that while CAPTCHAs are becoming increasingly more difficult for bots, they are also becoming more difficult and/or burdensome for human users. In certain instances, the desire to defeat the bots has resulted in images that are so distorted that some human users cannot decipher the images. This is particularly true with users having a visual deficiency or imparity. As a partial solution to this escalation of perception difficulty, some web sites have begun adding a link to a sound file that will speak the characters, but these sound files are also being drastically distorted to protect against being discerned by bots through speech pattern matching algorithms. Other web sites like Facebook.com, have gone so far as to adopt a practice requiring deciphering two distorted word images to increase the complexity for bots. While perhaps achieving the stated objective, the collateral effect is to exacerbate the existing burden to human users.

Current CAPTCHA technology is visual or auditory in nature, requiring the human user to answer a test that should be simple to most humans but difficult for non-humans, e.g., bots. Visual CAPTCHA using distorted images is widely used as the primary test by nearly every top Internet site including Yahoo, Google, You Tube, Microsoft's Live ID, MySpace, Facebook, Wikipedia, Craigs List. By using solely visual testing criteria, nearly all users will be able to invoke the requested action; not all users have functioning audio equipment or environments such as libraries may not permit such use.

A positive user experience is critical to the success and increased popularity of a given website. Designers of web sites go to great lengths to ensure their website is as user friendly as possible. Carnegie Mellon University estimates that 60 million CAPTCHA tests are deciphered every day and with an average time spent of 10 seconds, requiring a total of 150,000 hours of work spent every day trying to protect web sites from bots. Reducing or eliminating the requirement of a user having to decipher CAPTCHA is one more way websites can create a more positive user experience for their visitors and minimize opportunity costs.

SUMMARY OF THE INVENTION

The invention is generally directed to methods, systems and apparatus for assessing the likely user status of a computing device interacting with a server where computing device is in bi-directional operative communication with the server wherein the status is one of a human operator or a computer executable program (also referred to herein as a "bot"). This assessment comprises comparing acquired and/or available data relating to the operation of the computing device to suitable models embodying human user derived data (model data). In most embodiments, the comparison yields a probability value as to one of the status states 140, 330, which then may be used by a program or administrator of the server to permit or deny access and/or operation to the computing device. Because many of the invention embodiments provide a probability result as opposed to a binary result, the invention embodiments avoid the "there is only one right answer" phenomena inherent in prior art CAPTCHA tests. In other words, rather than placing the burden of proof on the user for functionality/access, which if the user is a human invokes the negative consequences of conventional CAPTCHA tests as previously described, the burden is shifted to the server side of the equation.

BRIEF DESCRIPTION OF THE DRAWINGS

The detailed description is described with reference to the accompanying figures. The use of the same reference numbers in different figures indicates similar or identical components or features.

DETAILED DESCRIPTION

Figure 1:
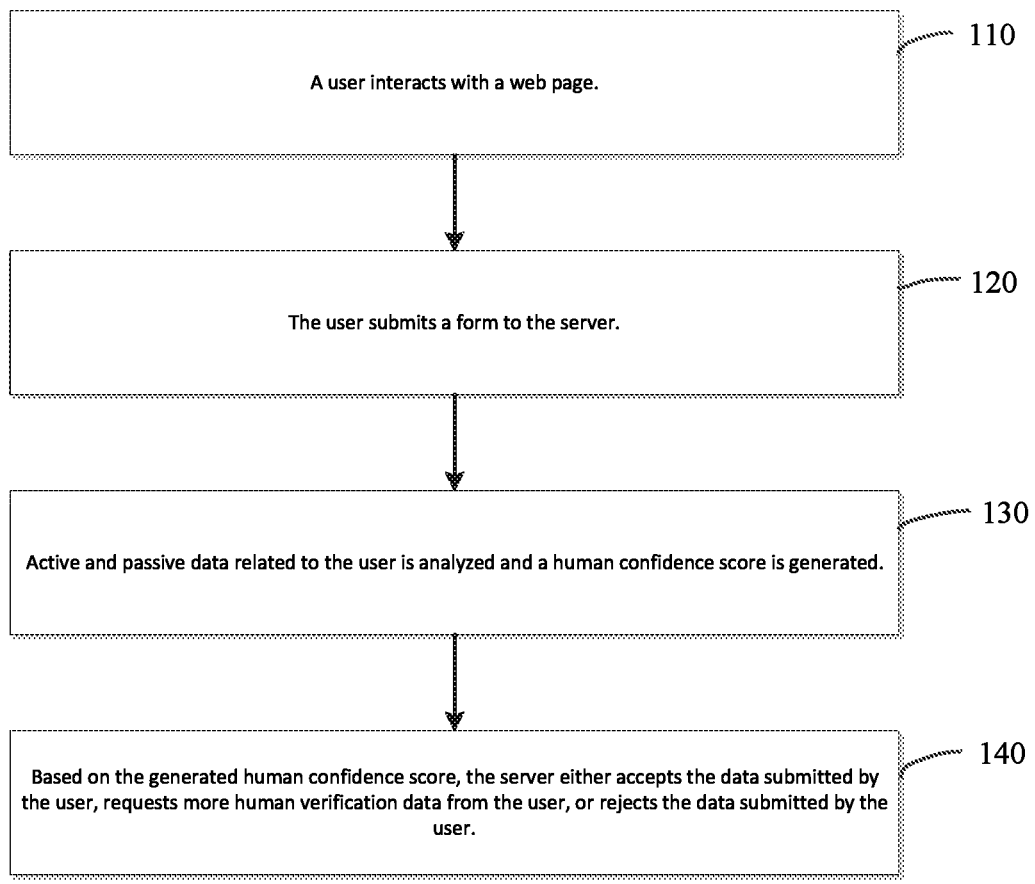
FIG. 1 illustrates an overview of the process described in this disclosure.
Figure 2:
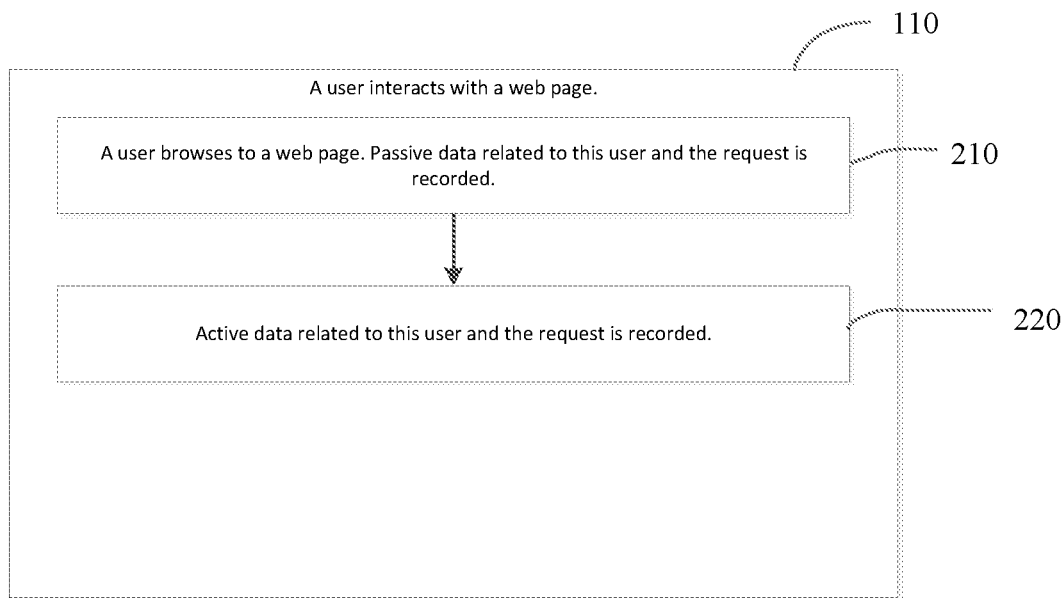
FIG. 2 illustrates in more detail the first step 110 of FIG. 1 (a user interacts with a web page).
Figure 3:
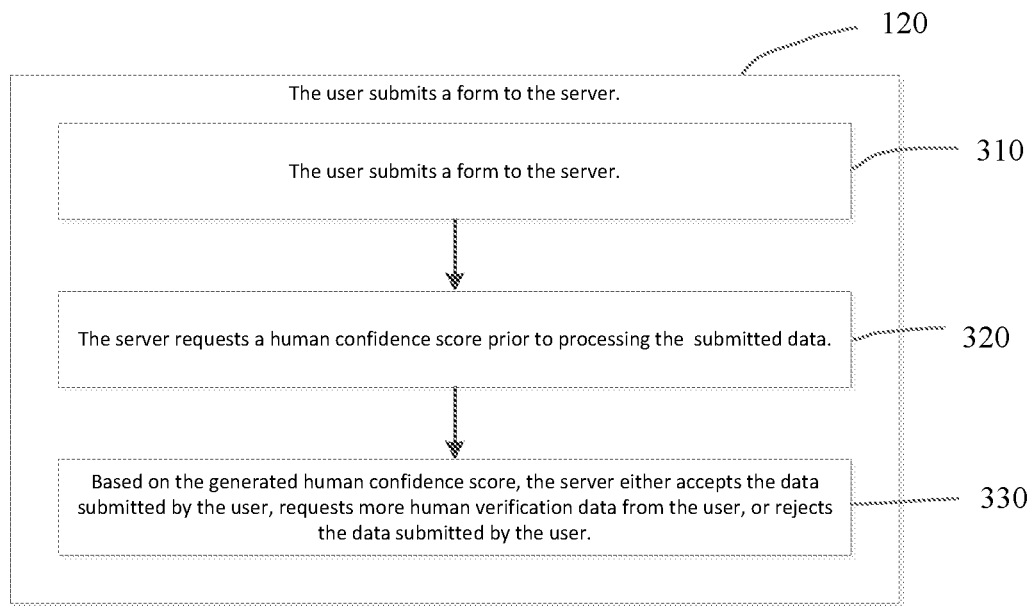
FIG. 3 illustrates in more detail the second step 120 of FIG. 1 (the user submits a form to the server).
Figure 4:
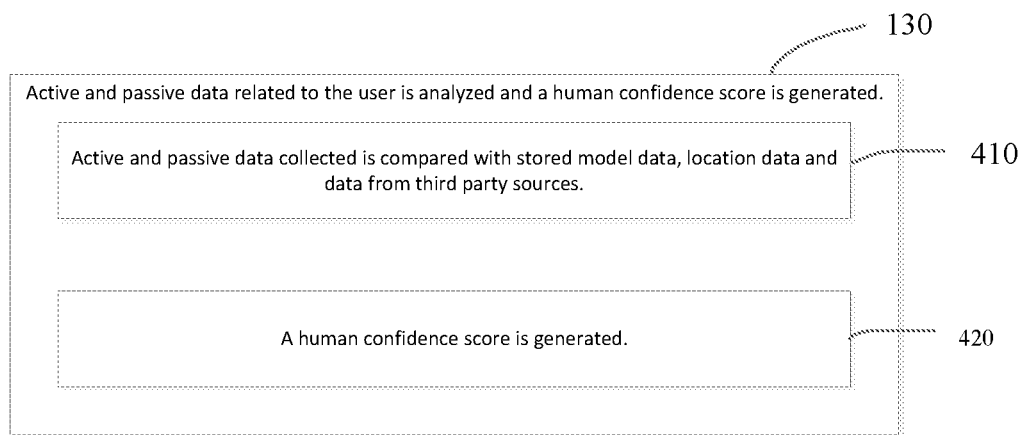
FIG. 4 illustrates in more detail the third step 130 of FIG. 1 (active and passive data related to the user is analyzed and a human confidence score is generated).

As used herein, "model data", its equivalents and verb forms comprises data indicative of human interaction with a computing environment and that can be received by a computing device that is physically remote from the sample computing environment and equivalents. Model data comprises two main categories: active model data 220 and passive model data 210. Active model data comprises data acquired from a computing device user's interactions therewith and within the computing environment where such data is not normally stored (logged) or transmitted to a remote location. Such model data includes, without limitation, pointing device vector movements and/or cadence, key stroke combinations and/or cadence, time differentials between stimulus (e.g., display of dialog box, radio button, form field, etc., and/or generation of sound) and user response (e.g., input into dialog box, selection of radio button, completion of form field, new page display request rates, etc., and/or input response to sound), and similar metrics. Generally, such data must be monitored and stored 210, 220 by a program operative on the computing device, which makes the data available to another program, preferably on a server 320, or actively transmits such data to a server. Passive model data comprises data available from a computing device user's interactions therewith and within the computing environment where such data is normally stored (logged) or transmitted to a remote location. Such model data includes, without limitation, browser cookies, destination IP histories, originating IP address, originating IP address traffic data, originating IP address physical location, third party data regarding abusers (including originating IP addresses and physical locations), etc.

Also as used herein, the term "available data", its equivalents and verb forms comprises data associated with a computing device's operation and its interaction with a computing environment, such as the Internet, that is generally recorded within the computing device and/or by other devices that have been affected by the computing device's operation—this is also a type of passive data; the term "acquired data", its equivalents and verb forms comprises data associated with a computing device's operation and its interaction with a computing environment, such as the Internet, that is generally not recorded within the computing device and/or by other devices that have been affected by the computing device's operation, but at least some data of which has/have been recorded and/or transmitted to a remote location, such as a server—this is a type of active data.

In addition to the foregoing, the term "issued data", its equivalents and verb forms comprises data generated by a server or other computing device that is not the same as the computing device for which the assessment as to user status is being performed; "monitored data", its equivalents and verb forms comprises active or passive data, whether available or acquired, obtained from the computing device, or as a result of its external interactions, after the generation of issued data; "interest data", its equivalents and verb forms comprises active or passive data, whether available or acquired, that correlates to any data within model data, whether obtained prior to or after the generation of issued data. Thus, interest data includes time independent available data and acquired data, unless qualified differently.

With the foregoing definitions in mind, operation of the various invention embodiments can be better understood. In a first series of embodiments, a comparison between interest data, acquired prior to delivery of issued data to the client computing device, and model data is performed to ascertain the likely status of the client computing device, i.e., human user or bot 130, 420. In a second series of embodiments, a comparison between monitored data, by definition acquired after delivery of issued data to the client computing device, and model data is performed to ascertain the likely status of the client computing device, i.e., human user or bot 130, 420. In both series of embodiments, acquired and/or available data may be used for comparison with suitable model data. The recited comparisons can take place locally on the computing device, remotely on the originating server, or on a server dedicated to performing such actions and for which subscriptions may be offered in conjunction with methods for providing services according to the methods, apparatus and systems embodiments described herein.

While available data represents data that is readily harvestable by query, for example, from the computing device or the computing environment in which the device operates, acquired data requires some form of information capture means. In the various embodiments described herein, the computing device is caused to monitor and retain certain data useful as acquired data for comparison purposes. Such monitoring and retaining means for acquiring data from the computing device comprises, without limitation, modification of (an) existing program(s) (e.g., such means are included in available browsers), a covert program (e.g., many malware applications log keystrokes and periodically pass them to remote servers for malicious purposes; similar technology can be used to exploit necessary aspects of the invention embodiments), or a servlet/Java applet. If user privacy is a concern, the monitoring and retaining means can remain dormant until activated by, for example, an enabled web site 110.

The monitoring and retaining means may also enable transmission of some or all retained data 410, in encrypted or unencrypted form, as may be desired for privacy and security purposes, and/or merely retain the data until requested from, for example, the server, at which time some or all data may be transmitted 120, 310. As described above with reference to the comparison actions 130, 410, such receiving and/or polling actions can be carried out remotely on the originating server or on a server dedicated to performing such actions, if not performed locally on the computing device.

From the foregoing, it can be seen that implementation of the invention embodiments can be accomplished exclusively from the server side; it is not necessary to distribute or install in the conventional sense client side software. Existing available browsers and operating systems provide the means necessary to temporarily install logging code, if such is elected. Moreover, the methods, and associated systems and apparatus, described herein are highly transparent to the user, thereby achieving an objective of enhancing the user's experience of a web site employing bot assessment protocols.

DESCRIPTION OF AN INVENTION EMBODIMENT

A primary objective of bot creation is to autonomously access data and/or functionality of a target server as quickly as possible. By assessing user biometrics having a time domain, the time variable becomes a necessary component to accessing the data and/or functionality of the server. Because such assessment has heretofore been absent as a valid CAPTCHA marker of a human user, and more importantly because proper data input would necessarily slow the process, the likelihood of bot penetration has been significantly reduced.

An embodiment of the invention employs a first layer of testing that simply checks if there were valid mouse movements and/or key strokes inputted by the user of a computing device that is attempting to access a server resource "protected" from bots. This basic "if-then" check is essentially without overhead since there are no computations being carried out.

Checking for the existence of the target activity therefore represents a first pass evaluation; if the bot is not programmed to include pseudo biometric data, further access is denied. In other words, if no activity is recorded there is a very high probability that the user is actually a bot.

A fundamental premise of robust biometrics is that a given dataset for each person is unique. Therefore, if the dataset is sufficiently robust, it is impossible to have duplicative input data unless the input data was derived from a machine. Exploiting this premise allows a second level knockout assessment to deny user access if the input data exactly (or statistically sufficiently) matches previously recorded data. Of course, the skilled practitioner employing this method can select (either explicitly or via programming) sample points of a dataset for comparison as opposed to all data, thereby reducing computational overhead and storage issues. Alternatively, if samples are used, an exact match could then invoke a more intensive comparison with the same stored datasets, where again access can be denied when an exact or statistically sufficient match is found.

In the foregoing two assessments, an object has been to ferret out bots in an efficient and low overhead manner by exploiting intrinsic design limitations. However, it is possible that a bot designer could spoof these assessment means by, for example, running many bots in parallel wherein intrinsic delays in CPU processing and bandwidth would introduce inherent time delays associated with the very inputs being assessed. Therefore, more robust assessment means may be employed to ascertain the presence of a bot.

In robust embodiments of the invention, a third layer of testing may be employed that compares recorded pointer movements and key strokes to previously recorded activity for a given input page that was knowingly created by humans. Thus, as input data is collected for a given page, patterns will emerge that are unique to human activity. Subsequently recorded activity that is inconsistent with these patterns would indicate the potential that the user is a bot. Access could then be denied, or further CAPTCHA tests presented. Alternatively, access could be granted since no lock is pick proof and an object of the invention embodiments is to minimize user exposure to CAPTCHA tests.

What is claimed:

1. A non-transitory machine readable medium having stored thereon instructions for performing a method for generating a value indicative of a likelihood that a human or autonomic computer application is operating a client computer attempting access to a protected page of a website, which when executed by at least one machine, causes the at least one machine to perform operations comprising:
    provide data collection data that causes the client computer to collect active data relating to interactions of the client computer with a given page of the website;
    receive at least some of the collected active data from the client computer and at least some passive data from the client computer;
    perform a first analysis comprising analyzing at least some of the received active data and at least some of the received passive data in conjunction with model data based on human interactions from a prior session with the same website;
    generate a first analysis value based on the first analysis, wherein the client computer is allowed to access the protected page without requiring an operator of the client computer to decipher a CAPTCHA test if the first analysis value meets a first analysis predetermined criteria;
    determine that the first analysis value fails to meet the first analysis predetermined criteria;
    provide a CAPTCHA test to the client computer based on the determination that the first analysis value fails to meet the first analysis predetermined criteria;
    receive a response of the client computer to the CAPTCHA test;
    perform a second analysis comprising assessing accuracy of the response of the client computer to the CAPTCHA test; and
    generate a second analysis value based on the second analysis, wherein the client computer is granted access to the protected page based on the second analysis value meeting a second analysis predetermined criteria.

2. The non-transitory machine readable medium of claim 1, further comprising instructions, when executed by the at least one machine, that cause the at least one machine to:
    provide an additional CAPTCHA test to the client computer based on the determination that the second analysis value fails to meet the second analysis predetermined criteria;
    receive a response of the client computer to the additional CAPTCHA test;
    perform a third analysis comprising assessing the accuracy of the client computer's response to the additional CAPTCHA test; and
    generate a third analysis value based on the third analysis, wherein the client computer is granted access to the protected page based on the third analysis value meeting a third analysis predetermined criteria.

3. The non-transitory machine readable medium of claim 1, wherein when the first analysis value meets a first analysis predetermined criteria, the client computer is not presented with a CAPTCHA test prior to the client computer being granted access to the protected page.

4. The non-transitory machine readable medium of claim 1, further comprising instructions, when executed by the at least one machine, that cause the at least one machine to decrypt the received active data and the received passive data.

5. The non-transitory machine readable medium of claim 1, wherein the model data is based on human interaction from a prior session with the same given page.

6. The non-transitory machine readable medium of claim 1, wherein the ability of the client computer to collect active data is only active while the client computer is visiting a web page enabled with data collection data.

7. The non-transitory machine readable medium of claim 1, further comprising instructions, when executed by the at least one machine, that cause the at least one machine to receive the first or second analysis predetermined criteria from an operator or administrator of the website.

8. The non-transitory machine readable medium of claim 1, further comprising instructions, when executed by the at least one machine, that cause the at least one machine to receive from an operator or administrator of the website a number of CAPTCHA tests that will be provided to a client computer after the second analysis value fails to meet the second analysis predetermined criteria.

9. The non-transitory machine readable medium of claim 1, wherein the step of analyzing at least some of the received active data and at least some of the received passive data in conjunction with model data further comprises analyzing mouse and keyboard activity of the client computer in conjunction with mouse and keyboard activity from human interactions from a prior session with the same website.

10. The non-transitory machine readable medium of claim 1, wherein the data collection data comprises JavaScript code that causes a browser of the client computer to collect the active data.

11. The non-transitory machine readable medium of claim 10, wherein the received passive data comprises at least one browser cookie and at least one Internet Protocol (IP) address associated with the client computer, and wherein the step of analyzing at least some of the received active data and at least some of the received passive data in conjunction with model data further includes analyzing the at least one browser cookie and the at least one IP address in conjunction with the model data.

12. The non-transitory machine readable medium of claim 11, wherein the step of analyzing at least some of the received active data and at least some of the received passive data in conjunction with model data includes analyzing manual device input activity of the client computer in conjunction with the model data based on human interaction with the same given page.

13. The non-transitory machine readable medium of claim 12, wherein the manual device input activity comprises mouse movement over a CAPTCHA test prompt.

14. The non-transitory machine readable medium of claim 12, wherein the human interaction from a prior session with the same website includes human interaction of another client computer from the prior session with the same given page.

15. The non-transitory machine readable medium of claim 14, wherein the received active data comprises keyboard activity of the client computer on the given page and wherein the step of analyzing at least some of the received active data and at least some of the received passive data in conjunction with model data further includes analyzing the keyboard activity in conjunction with the model data.

16. A non-transitory machine readable medium having stored thereon instructions for performing a method for providing a value indicating a judgment of whether a human or an autonomic computer application operating a client computer is interacting with a server, which when executed by at least one machine, causes the at least one machine to perform operations comprising:
provide data collection data requesting active and passive data of the client computer;
receive active and passive data responsive to the data collection data, the received active data relating to interactions of the client computer with a website of the server;
analyze the received active data and the received passive data for indication of a human or an autonomic computer application operating the client computer, wherein the analyzing includes analyzing the received active data and the received passive data in conjunction with model data based on human interactions from a prior session with the same website and developing a first analysis value;
determine that the first analysis value fails to meet a first analysis predetermined criteria; and
provide a request for further data from the client computer based on the determination that the first analysis value fails to meet the first analysis predetermined criteria.

17. The non-transitory machine readable medium of claim 16, wherein the first analysis value failing to meet the first analysis predetermined criteria indicates that the client computer should not be allowed access to a protected page of the website.

18. The non-transitory machine readable medium of claim 16, wherein the received active data includes manual input device activity and the received passive data includes at least one browser cookie and at least one IP address, and the analyzing includes analyzing the at least one browser cookie, the at least one IP address, and the manual input device activity in conjunction with model data based on human interactions from a prior session with the same website.

19. The non-transitory machine readable medium of claim 16, further comprising instructions, when executed by the at least one machine to decrypt the received active data and the received passive data.

20. The non-transitory machine readable medium of claim 16, further comprising instructions, when executed by the at least one machine, that cause the at least one machine to:
receive further data from the client computer in response to the request for further data;
perform a second level of analyzing on the received further data; and
provide a second analysis value based on the second level of analyzing.

21. The non-transitory machine readable medium of claim 20, wherein the received further data includes the response of the client computer to a CAPTCHA test provided to the client computer.

22. A non-transitory machine readable medium having stored thereon instructions for performing a method for providing a value indicating a judgment of whether a human or an autonomic computer application operating a client computer is interacting with a server, which when executed by the at least one machine, causes the at least one machine to perform operations comprising:
provide instructions that allow client computer interactions with a website of the server to be remotely monitored;
receive monitored data originating with the client computer, the monitored data comprising active data relating to interactions of the client computer with the website and passive data of the client computer;
analyze the received monitored data for indication of a human or an autonomic computer application operating the client computer, the analyzing including:
perform a first level of analyzing on the received monitored data for any indication that a human may be operating the client computer to obtain a first-level analysis;
perform a second level of analyzing to obtain a second-level analysis, when the first-level analysis does not meet a first-level analysis predetermined criteria, the second level of analyzing comprising analyzing the received monitored data in conjunction with previously recorded data relating to human interactions from a prior session with the same website; and
provide a second-level analysis value when the second-level analysis meets a second-level analysis predetermined criteria.

23. The non-transitory machine readable medium of claim 22, further comprising instructions, when executed by the at least one machine, that cause the at least one machine to decrypt the received monitored data.

24. The non-transitory machine readable medium of claim 22, wherein the monitored data comprises active data relating to interactions of the client computer with a given page of the website and passive data of the client computer, and the recorded data relates to human interaction from a prior session with the same given page.

25. The non-transitory machine readable medium of claim 22, the analyzing further comprising instructions, when executed by the at least one machine, that cause the at least one machine to:
provide a request for further data from the client computer based on the determination that the second-level analysis does not meet the second level analysis predetermined criteria.

26. The non-transitory machine readable medium of claim 25, the analyzing further comprising instructions, when executed by the at least one machine, that cause the at least one machine to:
receive further data from the client computer in response to the request for further data;
perform a third-level of analyzing on the received further data; and
provide a third-level analysis value after completion of the third-level of analyzing.

27. The non-transitory machine readable medium of claim 26, wherein the request for further data includes a CAPTCHA test.

28. The non-transitory machine readable medium of claim 22, wherein the received monitored data includes at least one browser cookie and at least one IP address.

29. The non-transitory machine readable medium of claim 28, wherein the received monitored data includes manual device input activity.

30. The non-transitory machine readable medium of claim 29, wherein the manual device input activity comprises mouse movement and key strokes.

* * * * *